United States Patent
Petersen et al.

(10) Patent No.: US 11,863,239 B2
(45) Date of Patent: Jan. 2, 2024

(54) CELLULAR AUTOMATON FOR USE IN LONG-RANGE ACOUSTIC NETWORKS

(71) Applicant: L3Harris Technologies, Inc., Melbourne, FL (US)

(72) Inventors: Timothy Petersen, Camden, NJ (US); Richard Winslow, Fort Wayne, IN (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

(21) Appl. No.: 17/669,606

(22) Filed: Feb. 11, 2022

(65) Prior Publication Data

US 2023/0261764 A1    Aug. 17, 2023

(51) Int. Cl.
| | |
|---|---|
| *H04B 11/00* | (2006.01) |
| *H04B 13/02* | (2006.01) |
| *H04L 9/40* | (2022.01) |
| *H04W 64/00* | (2009.01) |

(52) U.S. Cl.
CPC ............. *H04B 11/00* (2013.01); *H04B 13/02* (2013.01); *H04L 63/0428* (2013.01); *H04W 64/006* (2013.01)

(58) Field of Classification Search
CPC ..... H04B 11/00; H04B 13/02; H04L 63/0428; H04W 64/006
See application file for complete search history.

(56) References Cited

U.S. PATENT DOCUMENTS

| | | | |
|---|---|---|---|
| 6,629,037 B1 | 9/2003 | Nyland | |
| 2008/0144442 A1* | 6/2008 | Combee | .................... G01V 1/22 367/131 |
| 2011/0001512 A1* | 1/2011 | Pavicic | ................ H03K 19/177 326/104 |

(Continued)

FOREIGN PATENT DOCUMENTS

| | | |
|---|---|---|
| CN | 102256327 A | 11/2011 |
| CN | 102802246 A * | 11/2012 |

(Continued)

OTHER PUBLICATIONS

Ateniese et al., "SecFUN: Security framework for Underwater Acoustic Sensor Networks", Oceans 2015, pp. 1-9, (2015) (Year: 2015).*

(Continued)

*Primary Examiner* — Yuqing Xiao
*Assistant Examiner* — Christopher Richard Walker
(74) *Attorney, Agent, or Firm* — Edell, Shapiro & Finnan, LLC

(57) ABSTRACT

Techniques of present disclosure are directed to methods of providing acoustic communication networks. For example, methods are provided for that include obtaining, at a first transceiver of a plurality of transceivers arranged within an installation pattern, a first acoustic signal provided by a second transceiver of the plurality of transceivers. A location of the first transceiver within a message distribution pattern is determined from the acoustic signal. A delay based upon the location of the first transceiver within the message distribution pattern is determined. Finally, a second acoustic signal corresponding to the first acoustic signal is provided from the first transceiver after the delay.

20 Claims, 8 Drawing Sheets

(56) References Cited

U.S. PATENT DOCUMENTS

2020/0186937 A1* 6/2020 Kent .................. G10K 11/02
2020/0404744 A1* 12/2020 Ammar ............... H04W 84/20

FOREIGN PATENT DOCUMENTS

| CN | 102802246 B | | 12/2014 | | |
|---|---|---|---|---|---|
| CN | 108810841 B | * | 12/2020 | ............ | H04B 13/02 |
| CN | 113766597 A | * | 12/2021 | | |
| CN | 114125069 A | * | 3/2022 | ............ | H04B 11/00 |

OTHER PUBLICATIONS

Mourya et al., "Software Perspective to Underwater Acoustic Sensors Network", 2015 1st International Conference on Next Generation Computing Technologies, (2015) (Year: 2015).*
CN-114125069-A (Machine Translation) (Year: 2022).*
CN-102802246-A (Machine Translation) (Year: 2012).*
CN-108810841-B (Machine Translation) (Year: 2020).*
CN-113766597-A (Machine Translation) (Year: 2021).*
Beaujean, P.P., and J.P. Spruance, "A Very High Bit Rate Broadband Acoustic Modem or Short-to-Medium Range Data Transmission in Ports and Shallow Water using Spread Spectrum Modulation and Decision Feedback Equalizing", Florida Atlantic Univ Dania Beach Fl Ocean Engineering Dept., pp. 1-10 (2008).
Lee, J., et al., "Formalization of Asynchronous Cellular Automata Using Asynchronous Protocol for Communications", IEEEE 2018 Sixth International Symposium on Computing and Networking Workshops (CANDARW), pp. 38-41 (2018).

* cited by examiner

CELLULAR AUTOMATON FOR USE IN LONG-RANGE ACOUSTIC NETWORKS

STATEMENT OF GOVERNMENTAL INTEREST

This invention was made with U.S. Government support under contract no. N66001-20-C-4007 awarded by the U.S. Government. The U.S. Government has certain rights in the invention.

TECHNICAL FIELD

The present disclosure relates to acoustic communication networks.

BACKGROUND

Underwater acoustic communication is a technique of sending and receiving messages below water. There are several ways of employing such communication, but one of the most common is by using hydrophones. Underwater communication is difficult due to factors such as multi-path propagation, time variations of the channel, small available bandwidth and strong signal attenuation, especially over long ranges. Compared to terrestrial communication, underwater communication has low data rates because it uses acoustic waves instead of electromagnetic waves.

Underwater acoustic communication networks may include sensors and autonomous underwater vehicles that interact, coordinate and share information with each other to carry out sensing and monitoring functions.

DESCRIPTION OF EXAMPLE EMBODIMENTS

Overview

Provided according to the techniques of present disclosure are methods of providing acoustic communication networks. For example, methods are provided for that include obtaining, at a first transceiver of a plurality of transceivers arranged within an installation pattern, a first acoustic signal provided by a second transceiver of the plurality of transceivers. A location of the first transceiver within a message distribution pattern is determined from the acoustic signal. A delay based upon the location of the first transceiver within the message distribution pattern is determined. Finally, a second acoustic signal corresponding to the first acoustic signal is provided from the first transceiver after the delay.

The techniques of the present disclosure also provide for systems that include a plurality of transceivers arranged in an installation pattern. Each transceiver of the plurality of transceivers is configured to obtain a first acoustic signal from another of the plurality of transceivers. Each transceiver is also configured to determine, from the acoustic signal, a location of the transceiver within a message distribution pattern; determine a delay based upon the location within the message distribution pattern; and provide a second acoustic signal corresponding to the first acoustic signal.

The techniques of the present disclosure also provide for apparatuses that include one or more speakers, one or more microphones, and one or more processors. The one or more processors are configured to obtain, via the one or more microphones, a first acoustic signal from a transceiver of a plurality of transceivers arranged in an installation pattern; determine, from the acoustic signal, a location of the apparatus within a message distribution pattern; determine a delay based upon the location within the message distribution pattern; and provide, via the one or more speakers after the delay, a second acoustic signal corresponding to the first acoustic signal.

Example Embodiments

Figure 1:
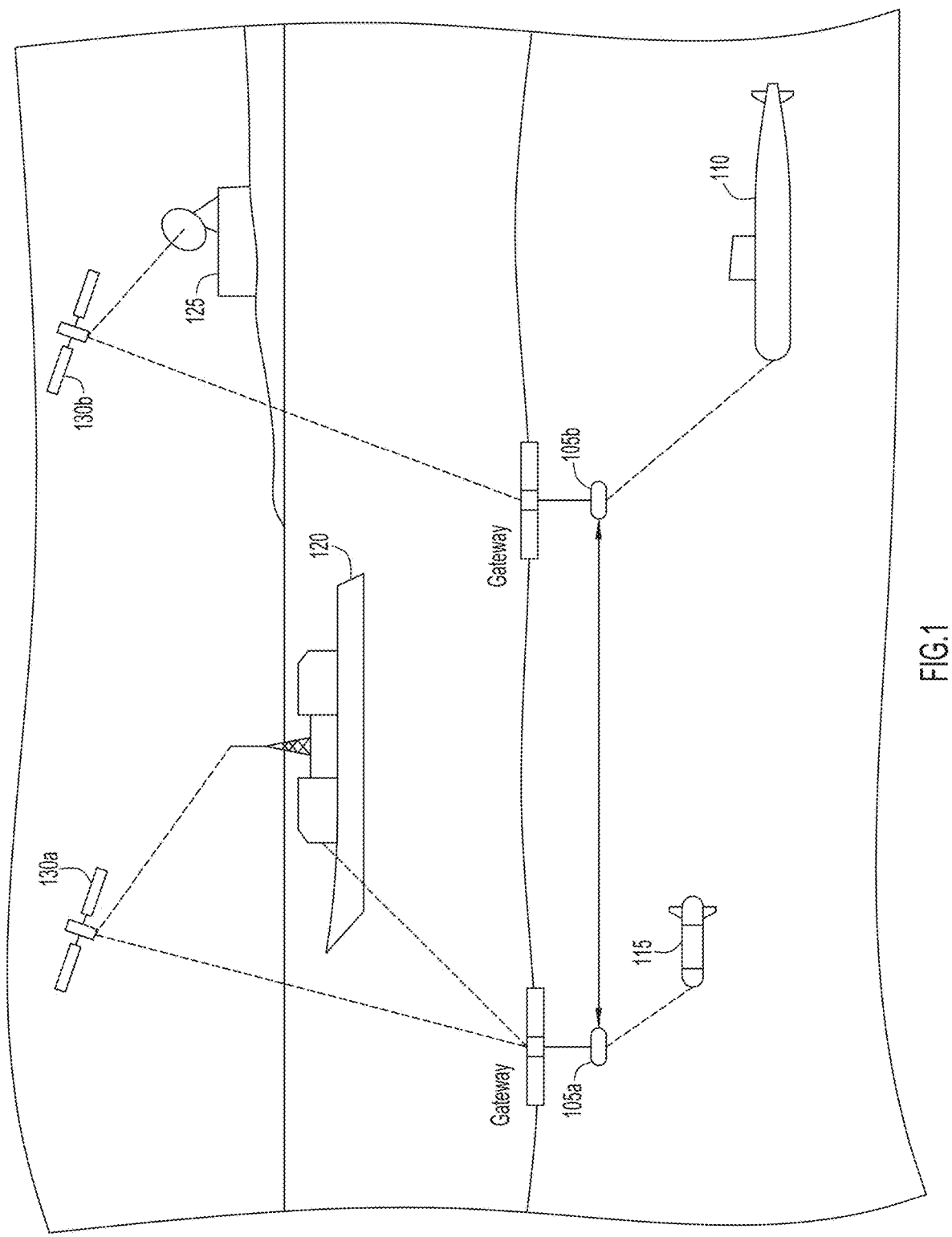
FIG. 1 is an illustration of the elements of an underwater communication network, according to an example embodiment.

With reference now made to FIG. 1, depicted therein is a network environment 100 configured to provide an underwater communication network (UCN). Specifically, network environment 100 includes communication gateways 105a and 105b. The gateways 105a and 105b are configured with acoustic modems that allow them to communicate underwater amongst themselves, as well as with acoustic modems incorporated into manned submersible vehicles 110 and unmanned submersible vehicles 115. Gateways 105a and 105b may also be configured to communicate with surface vessels 120, land-based gateways 125 and air and space vehicles 130a and 130b using wireless communication techniques, including wireless protocols, such as the IEEE 802.11 family of protocols, cellular protocols, such as the 5G protocol, and other radio frequency (RF) techniques.

The acoustic modems within a UCN may, in general, be subject to operational constraints not present in other types of modems. For example, the transmissions from acoustic modems may be multipath, as it may be difficult to generate directed pressure waves used to transmit acoustic signals. Also, the medium used by acoustic modems, which is water for UCNs, exhibits relatively slow propagation times. Specifically, the speed of sound in water is 1,500 meters per second compared with approximately 300,000,000 meters per second for RF and other electromagnetic-based communication techniques. Furthermore, acoustic modems like those incorporated into gateways 105a and 105b may operate with relatively low bandwidth (e.g., operating frequencies of around 5 kHz to 32 KHz). These constraints may result in low transmission speeds on the order of bits per second or kilobits per second. Furthermore, dependent on the types of acoustic modems employed, the modems may be limited to half duplex communication, as well as limited in multiple access and Open Systems Interconnection (OSI) Model Layer 2 functionality. The combination of these factors prevents UCNs from using approaches based on instantaneous or near-instantaneous message collision detection and carrier-signal sensing that are ubiquitous in today's optical, electronic, and radio frequency networks, such as Media Access Control (MAC) techniques. Accordingly, example embodiments of the techniques disclosed herein provide for cellular automaton approaches that overcome the collision detection and carrier-signal sensing challenges in the underwater environment.

These constraints may make it relatively difficult to implement long range UCNs. Long range, as used in the present disclosure, refers to UCNs in which the distance between UCN network elements (e.g., communication gateways 105a and 105b, manned submersible vehicles 110, unmanned submersible vehicles 115, and surface vessels 120) may be on the order of 8 km or greater. In such long range UCNs, communications may lag due to multiple second propagation times. Additionally, the network nodes may need to be self-powered as there is no undersea power grid, and the network nodes may experience collisions, collisions being when a messages is unable to be interpreted because of multiple signals being present. Accordingly, it may be difficult to implement long range UCNs that are reliable and that remain functional for months or years at a time. Given the nature of UCNs, and long range UCNs in particular, the acoustic modems of gateways 105a and 105b may be configured to address these constraints and challenges utilizing the techniques of the present disclosure. Accordingly, the acoustic modems associated with gateways 105a and 105b may be configured to operate as cellular automatons.

A cellular automaton consists of a regular grid of cells, each in one of a finite number of states such that every cell interacts with its neighbors. At each step in time or epoch, the automatons undergo a state transition. For example, according to one implementation of cellular automatons known as Conway's Game of Live, the automatons may undergo one of the following state transitions:

Any live cell with fewer than two live neighbors dies, as if by under population;
Any live cell with two or three live neighbors lives on to the next generation;
Any live cell with more than three live neighbors dies, as if by overpopulation;
Any dead cell with exactly three live neighbors becomes a live cell, as if by reproduction or colonization.

Figure 2:
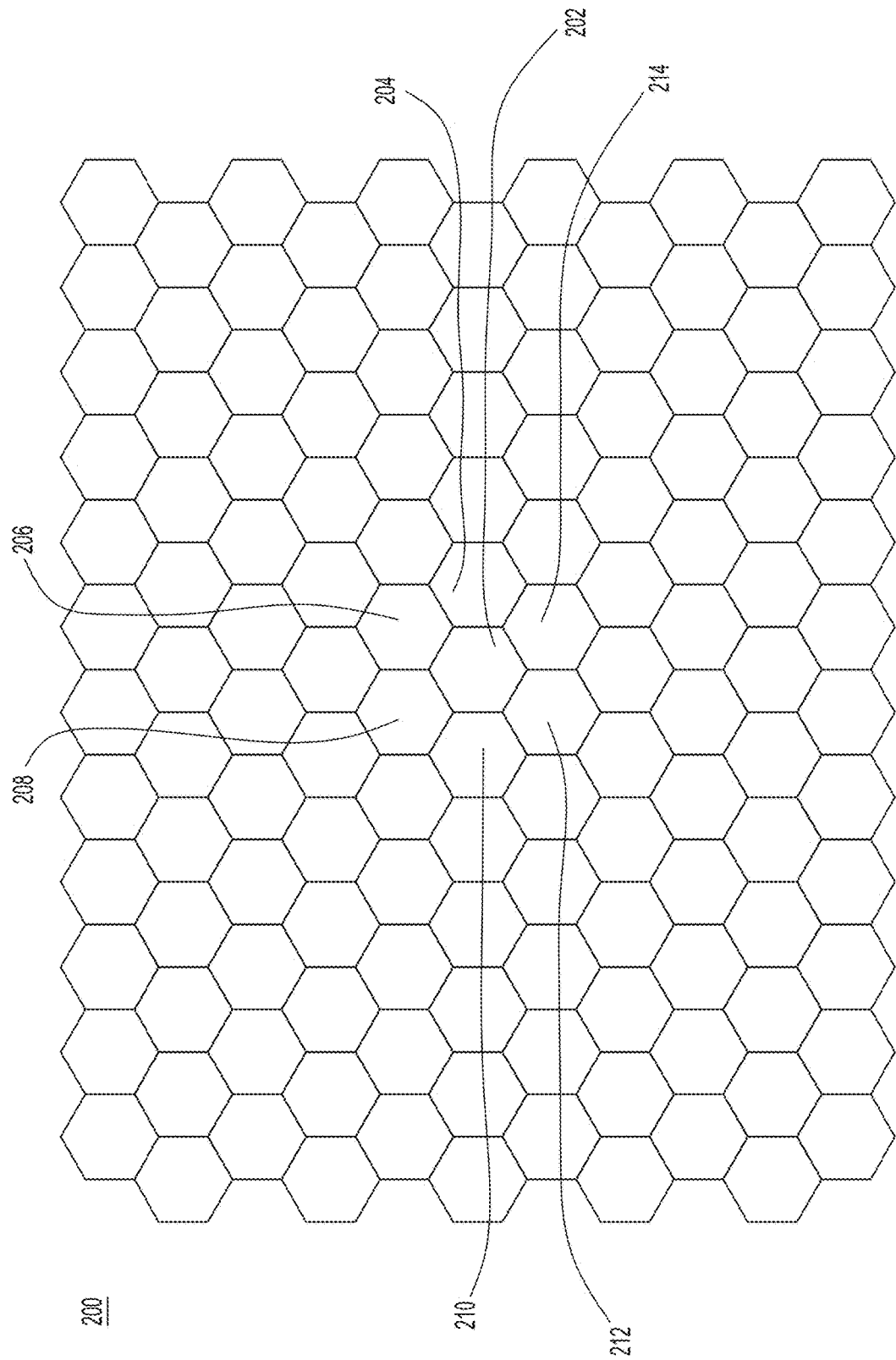
FIG. 2 is an illustration of an underwater communication network in which network elements are arranged within an installation pattern, according to an example embodiment.

According to the techniques of the present disclosure, the modems of gateways 105a and 105b are configured to operate as automatons within a grid of cells, but with different rules than those utilized in Conway's Game of Life. In one specific embodiment, the acoustic modems of gateways 105a and 105b are arranged in a hexagonal grid 200 of modems, as illustrated with reference to FIG. 2. In grid 200, it is assumed that a modem is arranged at the center of each of the illustrated hexagonal cells.

In hexagonal grid 200, each cell has six neighbors. Accordingly, node 202 has neighbor nodes 204, 206, 208, 210, 212 and 214. The use of a hexagonal grid may increase reliability compared to, for example, a square grid. A hexagonal grid may provide approximately equal transmission distances from node 202 to each of its neighbor nodes 204, 206, 208, 210, 212 and 214, which may help provide increased reliability.

The modems of hexagonal grid 200 may also be configured to operate according to a number of design rules. For example, no modem may transmit a signal while an adjacent modem is transmitting. Accordingly, the modem of node 202 cannot transmit while any one of the modems of nodes 204, 206, 208, 210, 212 or 214 is transmitting. Similarly, the modem of node 206 may not transmit while the modem of node 208 is transmitting, but the modem of node 206 may transmit while the modem of node 210 is transmitting, as nodes 206 and 210 are not neighbors. Furthermore, should node 206 and node 210 transmit simultaneously, nodes that are adjacent to both of node 206 and node 210 (such as node 202 and node 208) will not reliably receive the signals transmitted by node 206 and node 210 because the mutually adjacent nodes are simultaneously receiving signals from two transmitters, preventing the reception of either of the transmissions from node 206 and 210.

Finally, each of the modems of hexagonal grid 200 may be configured with signal transmission states based upon their relative position to other modems within hexagonal grid 200 to ensure that the nodes operate according to the above-described design rules. For example, each of the nodes within hexagonal grid 200 may be configured to transmit a received signal in the next epoch after receipt, or further delayed by one or more additional epochs, based upon the relative location of the node within hexagonal grid 200. In some embodiments, the nodes of hexagonal grid 200 may be configured to select among two values for the delay between receiving the acoustic signal and retransmitting the acoustic signal. In such embodiments, the nodes may select between delaying retransmission until the next epoch after the acoustic signal was received or further delaying until the second epoch after the acoustic signal was received. In other embodiments, the nodes of hexagonal grid 200 may be configured to select among two or more possible delays. For example, some nodes may be configured such that they select among retransmitting a received signal in the very next epoch after it is received, retransmitting the signal in the second epoch after it was received, or retransmitting the signal in the third epoch after it was received. In each of these embodiments, the selection among the different delays is based upon the node's location within hexagonal grid 200 relative to the initial source of the signal. This configuration of different rules for retransmission produces a dynamic message transmission pattern that overlays the hexagonal grid installation pattern of grid 200, examples of which shall be described with reference to FIGS. 3A, 3B and 4.

In other words, the modems of the hexagonal grid 200 may be embodied as a system that includes a plurality of transceivers arranged in an installation pattern. Each of the transceivers (e.g., modems) is configured to obtain or receive a first acoustic signal from another of the plurality of transceivers. Based on the received signal, each of the transceivers determines its relative location within a message distribution pattern. Furthermore, each of the plurality of transceivers determines a delay based upon the relative location within the message distribution pattern. Finally, each of the plurality of transceivers is configured to provide, after the delay, a second acoustic signal corresponding to the first acoustic signal.

Figure 3:
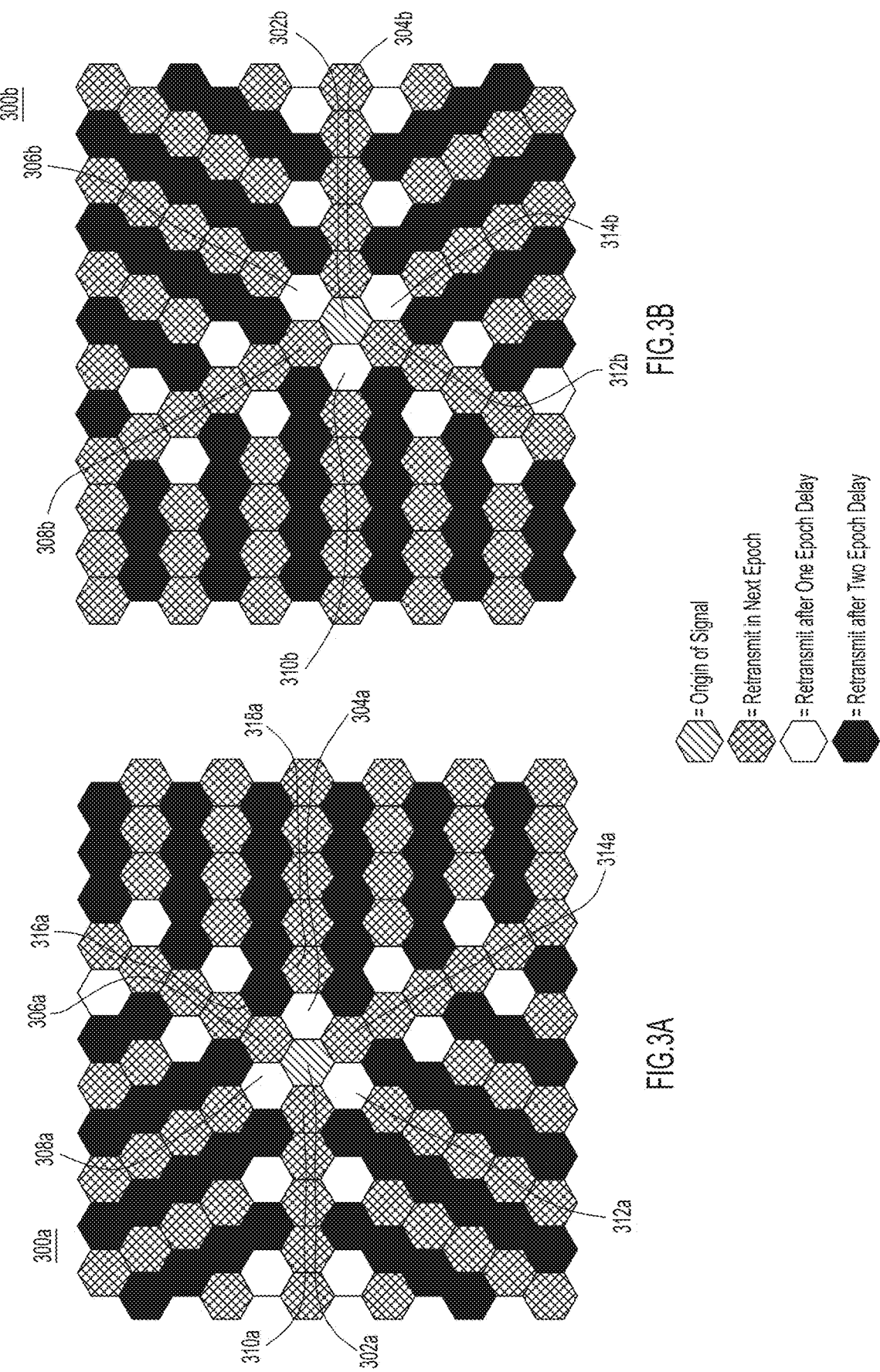
FIGS. 3A and 3B are illustrations of an underwater communication network in which network elements are arranged within an installation pattern with accompanying transmission rules that produce a message distribution pattern, according to an example embodiment.

With reference now made to FIGS. 3A and 3B, examples of predetermined transmissions pattern for the transceivers or modems of the present disclosure will now be described. Message distribution pattern 300a of FIG. 3A is illustrated as overlaid on a hexagonal gird, such as hexagonal grid 200 of FIG. 2. Within transmission pattern 300a, the acoustic modem associated with node 302a serves as the source of a transmission. Accordingly, some of the nodes, specifically, nodes 306*a*, 310*a* and 314*a*, have the state that they will retransmit the signal received from node 302*a* in the epoch immediately following its receipt from the modem of node 302*a*. Nodes 304*a*, 308*a* and 312*a*, on the other hand, are configured to delay one epoch before retransmitting the signal. Nodes 304*a*, 308*a* and 312*a* are configured with this delay because of the design constraint that no modem may transmit a signal while an adjacent modem is transmitting. For example, node 304*a* is adjacent to nodes 306*a* and 314*a*, both of which are configured to immediately retransmit the signal in the next epoch. Because node 304*a* cannot transmit while these adjacent nodes are transmitting, it must delay its retransmission until after nodes 306*a* and 314*a* are done retransmitting the signal. The modem of node 316*a*, on the other hand, is configured to delay its retransmission of the received signal by two epochs based upon its arrangement within message distribution pattern 300*a*. For example, the modem of node 316*a* will receive the transmission from the modem of node 306*a* when the modem of node 306*a* retransmits the signal received from the mode of node 302*a*. Node 316*a* must delay its retransmission while node 304*a* is retransmitting, as it is adjacent to node 304*a*, resulting in a delay of one epoch. The modem of node 316*a* must also delay a second epoch as it must delay its retransmission of the signal until after the modem of node 318*a* has finished retransmitting the signal.

The message distribution pattern 300*a* of the nodes as illustrated in FIG. 3A is just an example, and other design parameters for an acoustic network may result in different message distribution patterns. For example, the message distribution pattern of the nodes may be rotated, as illustrated in FIG. 3B. As shown in FIG. 3B, the message distribution pattern of the network nodes may be rotated about the source node for the transmission. In the example of message distribution pattern 300*b*, has been rotated 180° relative to message distribution pattern 300*a* of FIG. 3A.

Additionally, the message distribution patterns illustrated in FIGS. 3A and 3B are based on the location of a particular node relative to the location of the source of a signal. Other considerations may be used in determining the state for a particular node. For example, a signal may include a hop count (i.e., a count indicating how many nodes the signal has traversed on its way to reaching the receiving node). This hop count may be an additional consideration in determining the transmission state for a particular node.

Figure 4:
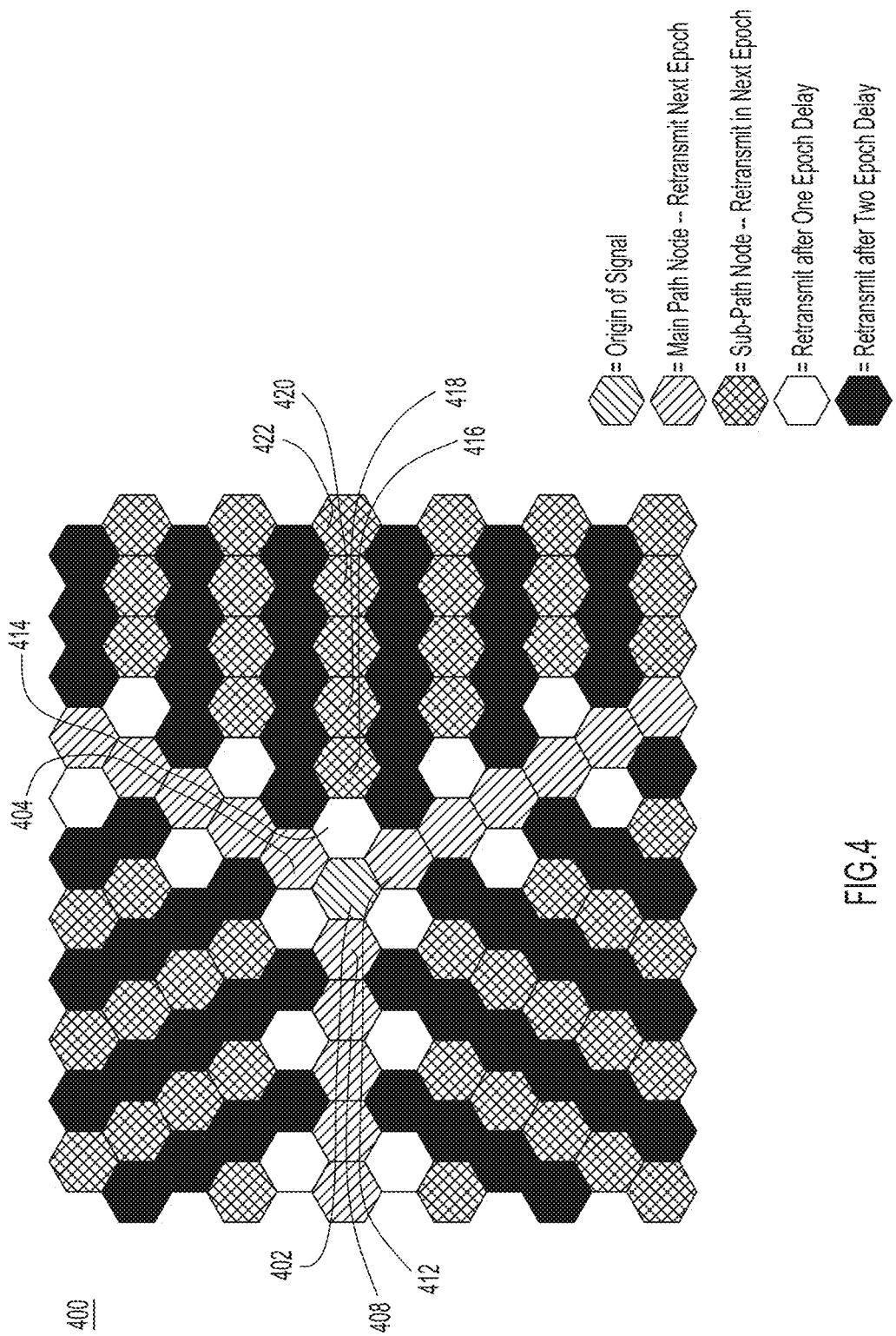
FIG. 4 is an illustration of main communication paths and sub communication paths through an underwater communication network in which network elements are arranged within a predetermined installation pattern, according to an example embodiment.

Another way to look at the message distribution patterns 300*a* and 300*b* of FIGS. 3A and 3B, respectively, is to see that the message distribution pattern of the nodes are arranged into main paths, and sub paths, which are illustrated in more detail in FIG. 4. As shown in FIG. 4, the main paths through message distribution pattern 400 extend outward from the modem of node 402, the origin of the transmission, through the modems of nodes 404, 408 and 412, respectively, which neighbor the source node 402 and are configured to retransmit the signal in the next epoch, to the edges of the grid. Rotations of message distribution pattern 400 may change the direction of each of the main paths, but no matter where the initialization is, the same direction will hold true. Sub paths extend from the source node 402 and the main paths after a one epoch delay. Accordingly, the sub path nodes are shown extending away from the origin and main paths after an initial delay of one epoch and then proceed to retransmit immediately thereafter. For example, the sub path that includes nodes 414, 416, 418, 420 and 422, extends from the origin node 402 after the one epoch delay from the modem of node 414. Nodes 416, 418, 420 and 422 then retransmit the received signal in the next epoch after receipt. These path and sub path patterns may be used to simplify the implementation of message distribution patterns in programmable logic devices.

Figure 5:
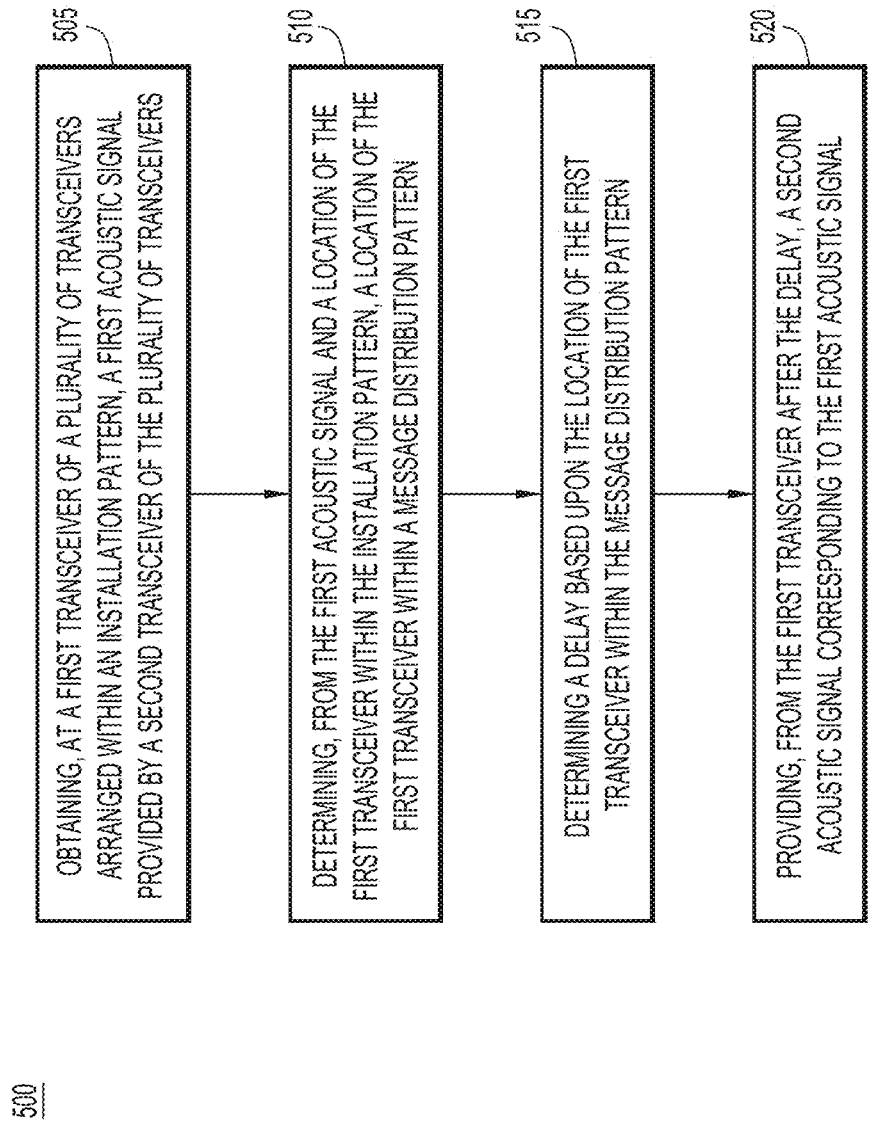
FIG. 5 is a flowchart illustrating a method for implementing the techniques of the present disclosure, according to an example embodiment.

With reference now made to FIG. 5, depicted therein is a flowchart 500 that includes operations that carry out an example embodiment of the techniques of the present disclosure. Flowchart 500 begins in operation 505 where a first acoustic signal is obtained (e.g., received) at a first transceiver of a plurality of transceivers. The first acoustic signal is provided by a second transceiver of the plurality of transceivers. The plurality of transceivers are arranged within an installation pattern. Accordingly, operation 505 may be embodied as a modem associated with one or more of nodes 304*a/b*, 306*a/b*, 308*a/b*, 310*a/b*, 312*a/b* or 314*a/b* of FIG. 3A or 3B receiving a signal from the modem of origin node 302*a/b*. For example, the hexagonal grid upon which message distribution patterns 300*a/b* are overlaid represents an installation pattern of transceivers. Therefore, operation 505 may be embodied as a transceiver associated with one of nodes 304*a/b*, 306*a/b*, 308*a/b*, 310*a/b*, 312*a/b* or 314*a/b* of FIG. 3A or 3B receiving a signal from the modem of origin node 302*a/b*. Operation 505 may also be embodied as any other modem associated with a node of the hexagonal grid upon which message distribution patterns 300*a/b* of FIG. 3A or 3B are overlaid receiving a signal from another modem associated with a node within the hexagonal grid.

In operation 510, a location of the first transceiver within a message distribution pattern is determined from the first acoustic signal and a location of the first transceiver within the installation pattern. For example, included within the acoustic signal may be data indicative of which transceiver within the plurality of transceivers was the source or origin of the signal. Using FIGS. 3A and 3B as a more specific example, an acoustic signal sent via the modems associated with the nodes of the hexagonal grids upon which message distribution patterns 300*a/b* of FIGS. 3A and 3B are overlaid may include data indicative of which node within the hexagonal grid was the origin or source node for the signal. The transceiver that receives that signal may contain data regarding the location of each node within the determined installation pattern. Accordingly, using the data from the acoustic signal indicating the origin or source of the signal in combination with the data stored at the transceiver regarding its location within the installation pattern, a determination may be made regarding the location of the first transceiver to the source or origin of the acoustic signal within the message distribution pattern. The data contained in the acoustic signal may include additional data, such as data indicative of the structure of the message distribution pattern and/or a rotation of the message distribution pattern, such as the rotations of message distribution patterns 300*a* and 300*b* illustrated in FIGS. 3A and 3B, respectively.

While the discussion above indicates that the data contained in the acoustic message directly identifies which node served as the source of a particular acoustic message, the data contained in the acoustic signal may provide an indirect indication of the source of the acoustic signal. For example, the acoustic signal may include a code. This code may be used by the receiving modem to determine which delay will be used in operation 520, discussed in more detail below. This code may indicate a value in a look-up table in the modem that returns a particular delay without ever specifically identifying a specific source node for the signal. Nevertheless, the code would correspond to a signal sent by one or more particular source nodes, and therefore, determining the code from the acoustic message indirectly determines the location of the receiving modem relative to the source or origin modem.

Next, a delay is determined in operation 515. This delay is based upon the location of the first transceiver within the message distribution pattern. For example, and as illustrated in FIGS. 3A, 3B and 4 above, each modem associated within a node in one of message distribution patterns 300a, 300b or 400 is configured to retransmit a received signal with a particular delay based upon its relative position to the origin or source node of the received signal within the message distribution patterns. Examples of such delays include waiting until the very next epoch to retransmit the signal, allowing one intervening epoch before retransmitting the signal, or waiting two intervening epochs before retransmitting the signal. Accordingly, using the location of the first transceiver relative to the source or origin of the acoustic signal, the transceiver may determine if it should retransmit the signal in the next epoch, retransmit the signal after a one epoch delay, or retransmit the signal after a two epoch delay.

Finally, in operation 520, the first transceiver provides a second acoustic signal corresponding to the first acoustic signal after the delay determined in operation 515. Accordingly, the providing of operation 520 may be embodied as the retransmission of an acoustic signal in the next epoch after the acoustic signal is received, retransmitting the acoustic signal after a one epoch delay, retransmitting the acoustic signal after a two epoch delay, or retransmitting the acoustic signal after some other delay.

Additionally, because message distribution by a node requires the expenditure of what may be limited lifetime power resources for that node, and because the message bandwidth of the UCN is limited, UCN nodes may implement cryptographic verification of received messages prior to acting on those messages or relaying them in a current or subsequent epoch. This cryptographic verification may use symmetric (e.g. pre-shared) or asymmetric (e.g. Public/Private) key material to provide message authentication and/or anti-replay capabilities. This cryptographic verification serves to prevent the exhaustion of UCN resources and to preserve the availability of the UCN for authorized messages. Accordingly, the method of flowchart 500 may include additional operations to implement such cryptographic verification of received messages. For example, after operation 505, in which an acoustic message is received, but before operation 520, in which the acoustic message is retransmitted, the message may be cryptographically verified using the authentication techniques described herein.

Figure 6:
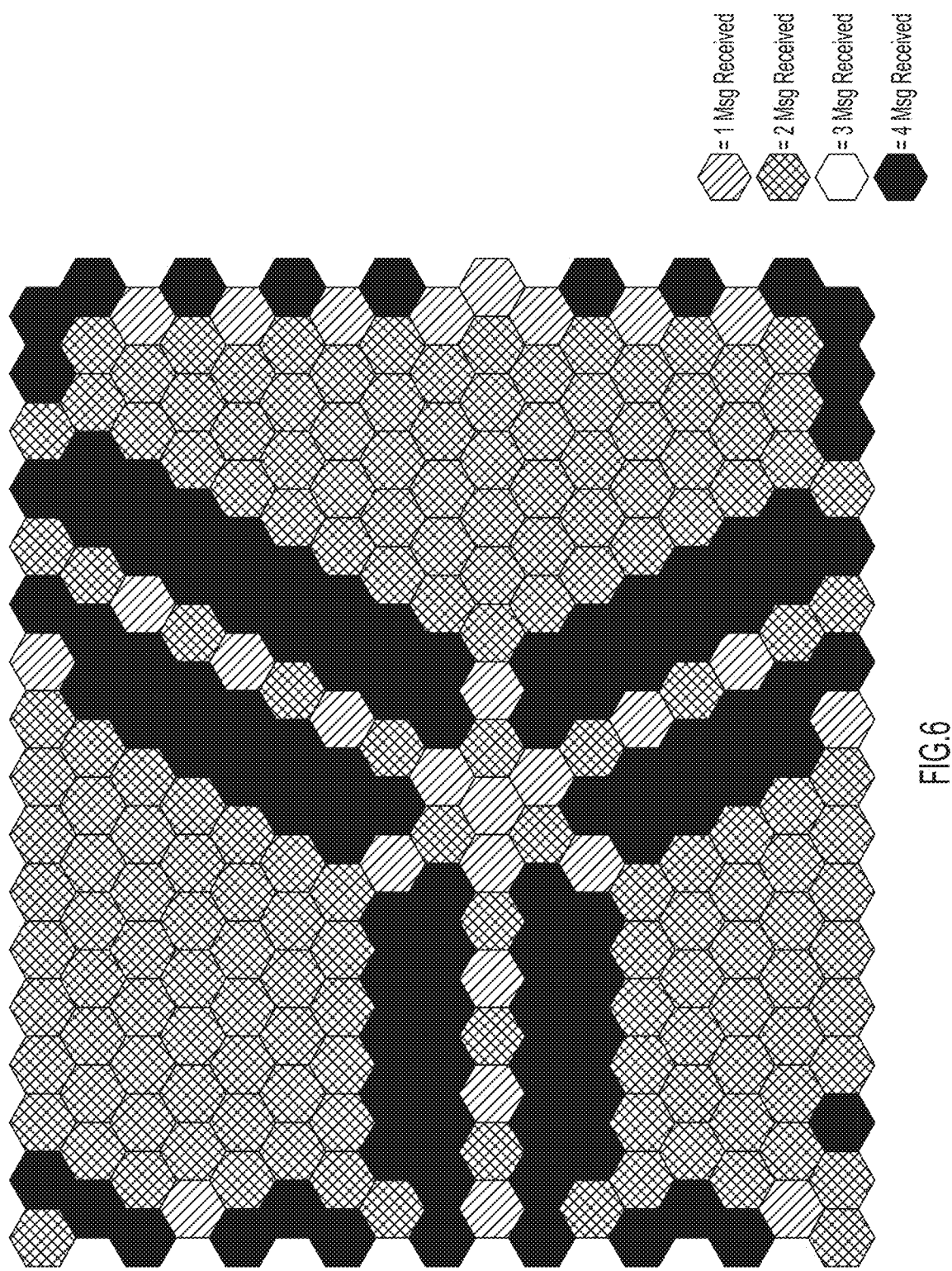
FIG. 6 is an illustration of the results of a first simulation of the techniques of the present disclosure, according to an example embodiment.

As described above, the techniques of the present disclosure may be used to implement UCNs that may be suitable for providing long range communications. Simulations of the techniques of the present disclosure have shown that implementing the techniques of the present disclosure may result in consistent, reliable and redundant communication of acoustic signals throughout a UCN. Illustrated in FIG. 6 are the results of a simulation of the techniques of the present disclosure in a UCN in which it is assumed that each modem may transmit its signals to adjacent modems within grid 600 with 100 percent reliability. Under this assumption, it can be seen that each node receives the message at least once after 18 epochs of communication, and the vast majority of the nodes receive the message two or three times, which may significantly improve the reliability of the UCN network. This is an important consideration for UCNs as it allows for networks to be established without needing to provide acknowledgement (ACK) messages, negative acknowledgement (NACK) messages, routing information protocol (RIP) messages, Internet Control Message Protocol (ICMP) messages, Open Shortest Path First (OSPF) protocol messages, Hello messages, and/or Keep alive messages. Being able to omit these messages may be particularly beneficial in UCNs. For example, each message sent in a network utilizes energy. In UCNs where many network elements are not directly connected to a power grid, and instead rely on battery power, being able to reliably communicate without having to send these signaling messages may result in a UCN that can operate for longer periods of time without maintenance or replacement of network nodes.

Figure 7:
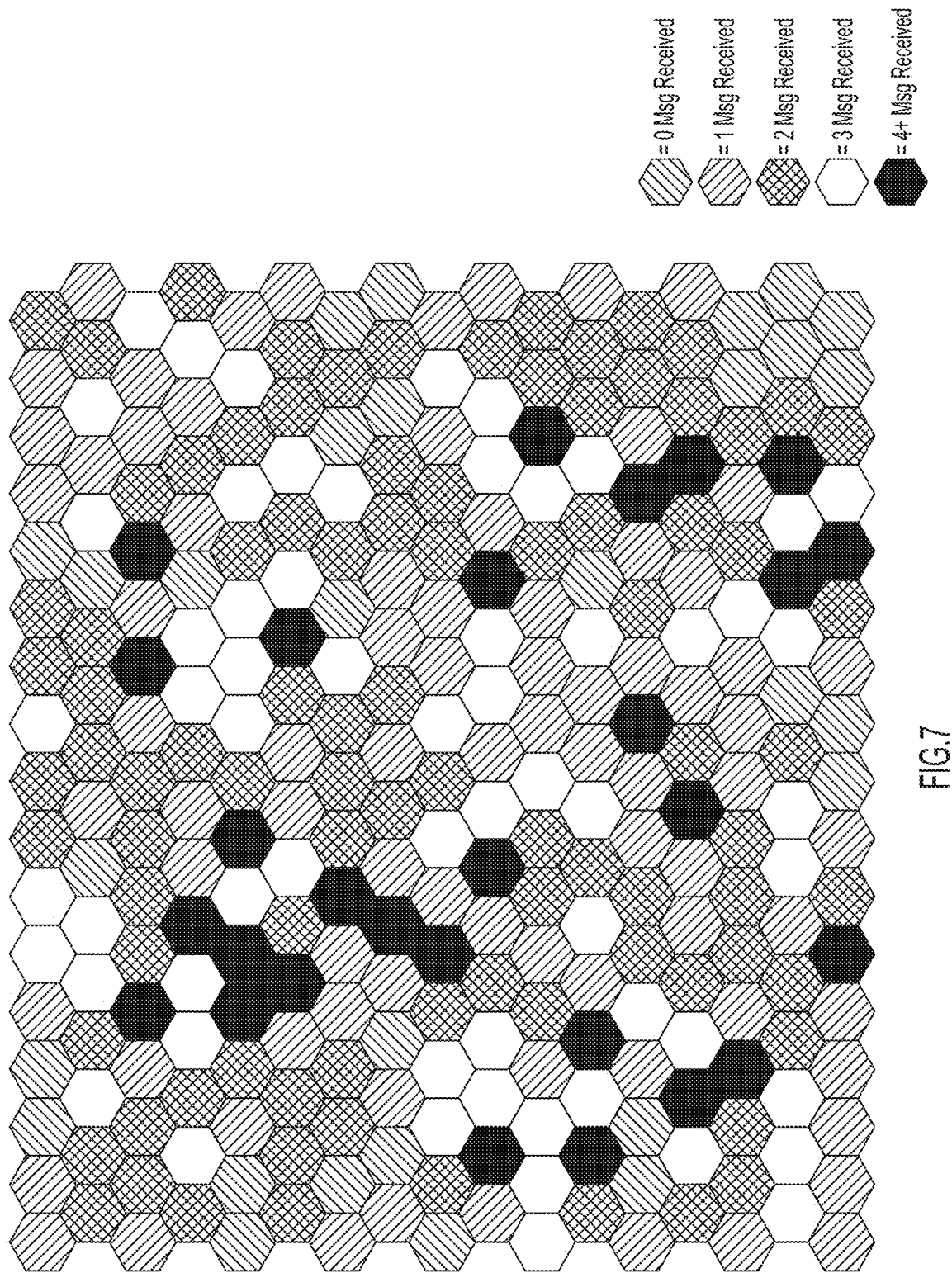
FIG. 7 is an illustration of the results of a second simulation of the techniques of the present disclosure, according to an example embodiment.

With reference now made to FIG. 7, depicted therein are the results 700 of a simulation in which modems in neighboring nodes are able to communicate with only 50 percent reliability, which represents an essentially "worst case" scenario. Even in this worst case scenario, it can be seen that the vast majority of the nodes receive the message after 30 epochs of communication. As illustrated, only 29 out of 289 nodes failed to receive the signal, meaning approximately 90 percent of the nodes received the signal. Furthermore, as shown in FIG. 7, a large number of nodes receive the signal multiple times, which may vastly improve the reliability of the UCN network.

Figure 8:
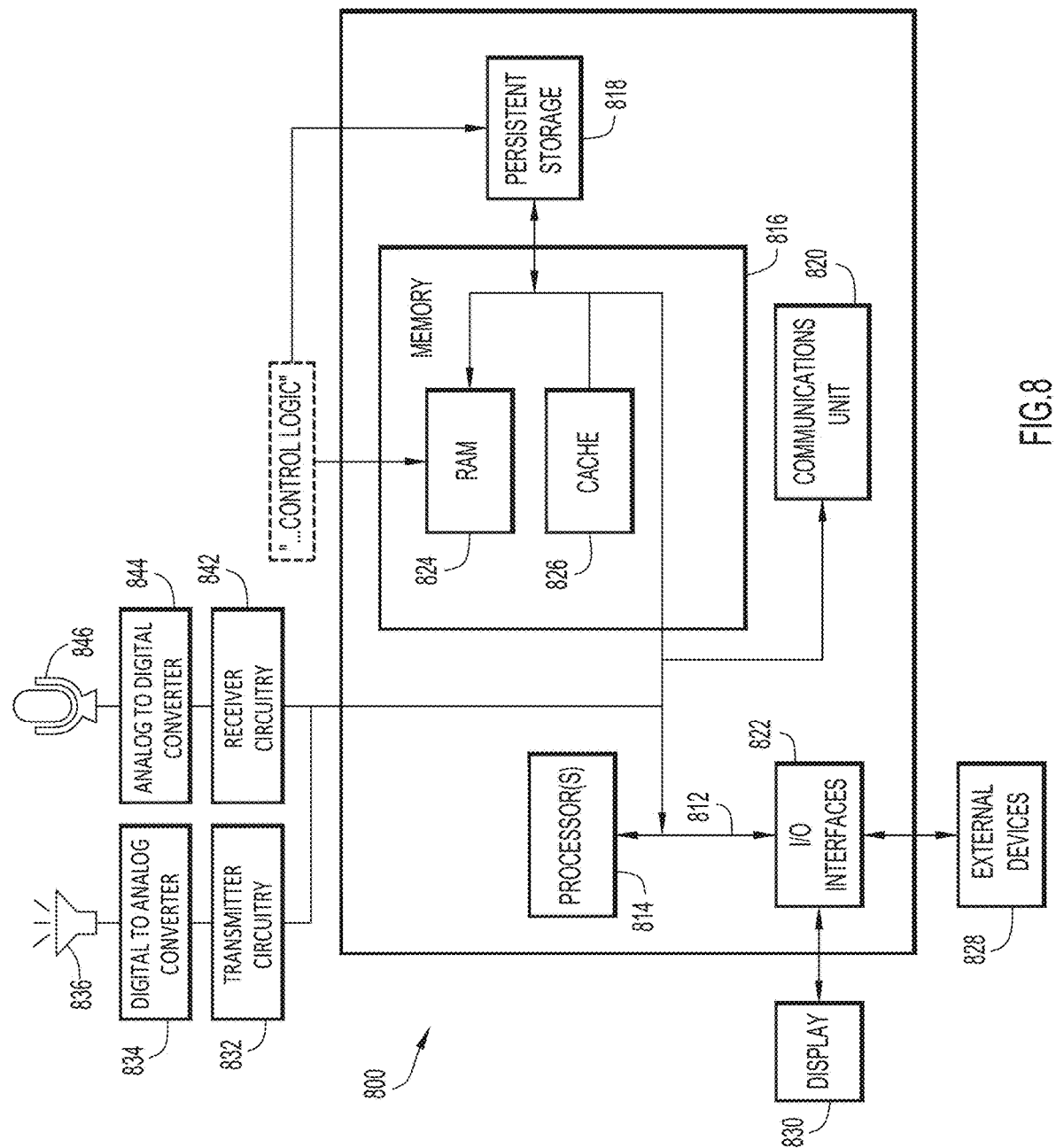
FIG. 8 is a functional block diagram of a device configured according to the techniques of the present disclosure, according to an example embodiment.

With reference now made to FIG. 8, illustrated therein a hardware block diagram of a device 800, such as an acoustic modem, that may perform the techniques of the present disclosure. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses. I/O interfaces 822 may be configured to receive data from external devices 828.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the techniques of the present disclosure may be stored in memory 816 or persistent storage 818 for execution by processor(s) 814. The control logic stored in memory 816 or persistent storage 818 may implement the techniques of the present disclosure.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links. Device 800 may also include an optional display 830.

When embodied as an acoustic modem, device 800 may include elements that allow it to transmit acoustic signals. Specifically, device 800 includes transmitter circuitry 832, digital to analog converter 834, and speaker 836 (sometimes also referred to as a transducer). Accordingly, processor 814 provides data to transmitter circuitry 832 via bus 812. Transmitter circuitry 832 processes the received data to prepare it for transmission as an acoustic signal. Transmitter circuitry 832 provides the prepared data to digital to analog converter 834, which drives speaker 836 to transmit the data as an acoustic signal.

Device 800 may also include elements that allow it to receive acoustic signals. Specifically, device 800 includes receiver circuitry 842, analog to digital converter 844, and microphone 846 (sometimes also referred to as a hydrophone). Accordingly, microphone 846 receives an acoustic signal, and provides it to analog to digital converter 844. Analog to digital converter converts the received signal into digital data that is provided to receiver circuitry 842. Receiver circuitry processes the received data and provides it to processors 814 via bus 812.

In summary, provided for in the present disclosure are methods that include the operations of: obtaining, at a first transceiver of a plurality of transceivers arranged within an installation pattern, a first acoustic signal provided by a second transceiver of the plurality of transceivers; determining, from the acoustic signal, a location of the first transceiver within a message distribution pattern; determining a delay based upon the location of the first transceiver within the message distribution pattern; and providing, from the first transceiver after the delay, a second acoustic signal corresponding to the first acoustic signal.

Also provided for are systems that include a plurality of transceivers arranged in an installation pattern. Each transceiver of the plurality of transceivers is configured to: obtain a first acoustic signal from another of the plurality of transceivers; determine, from the acoustic signal, a location within the message distribution pattern; determine a delay based upon the location within the message distribution pattern; and provide, after the delay, a second acoustic signal corresponding to the first acoustic signal.

The techniques of the present disclosure also provide for apparatuses that include: one or more speakers; one or more microphones, and one or more processors. The one or more processors are configured to: obtain, via the one or more microphones, a first acoustic signal from a transceiver of a plurality of transceivers arranged in an installation pattern; determine, from the acoustic signal and a location of the transceiver within the installation pattern, a location of the apparatus within a message distribution pattern; determine a delay based upon the location within the message distribution pattern; and provide, via the one or more speakers after the delay, a second acoustic signal corresponding to the first acoustic signal.

By implementing the techniques of the present disclosure, UCNs may be implemented that provide survivable, long lifetime mesh networks at low power. Such UCNs may be particularly suitable for Emergency Command and Control applications. Furthermore, UCNs implemented according to the techniques of the present disclosure may be suitable as backups to all other systems/networks. For example, even if Global Positioning System networks and RF infrastructure fails, UCNs implemented according to the techniques of the present disclosure may remain active.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
  obtaining, at a first transceiver of a plurality of transceivers arranged within an installation pattern, a first acoustic signal provided by a second transceiver of the plurality of transceivers, wherein the first acoustic signal is configured with data to be distributed throughout the plurality of transceivers;
  determining, from the first acoustic signal configured with the data to be distributed throughout the plurality of transceivers and a location of the first transceiver within the installation pattern, a location of the first transceiver within a message distribution pattern;
  determining a delay based upon the location of the first transceiver within the message distribution pattern; and
  providing, from the first transceiver after the delay, a second acoustic signal corresponding to the first acoustic signal and comprising the data to be distributed throughout the plurality of transceivers.

2. The method of claim 1, wherein the plurality of transceivers comprise an undersea communication network.

3. The method of claim 1, wherein the installation pattern comprises a hexagonal grid.

4. The method of claim 3, wherein the plurality of transceivers are substantially equally spaced within the hexagonal grid.

5. The method of claim 3, wherein determining the location of the first transceiver within the message distribution pattern comprises determining a location of the first transceiver in the hexagonal grid relative to an origin of the first acoustic signal.

6. The method of claim 1, wherein determining the delay comprises selecting among a long delay and a short delay based upon the location of the first transceiver within the message distribution pattern.

7. The method of claim 6, wherein the short delay comprises at least one of a delay until a next transmission epoch after the first acoustic signal was obtained or a delay until a second transmission epoch after the first acoustic signal was obtained.

8. The method of claim 1, wherein the second transceiver comprises an origin of the first acoustic signal.

9. The method of claim 1, further comprising cryptographically verifying the first acoustic signal prior providing the second acoustic signal.

10. A system comprising:
  a plurality of transceivers arranged in an installation pattern,
  wherein each transceiver of the plurality of transceivers is configured to:
    obtain a first acoustic signal from another of the plurality of transceivers, wherein the first acoustic signal is configured with data to be distributed throughout the plurality of transceivers;

determine, from the first acoustic signal configured with the data to be distributed throughout the plurality of transceivers and a location of the transceiver within the installation pattern, a location of the transceiver within a message distribution pattern;

determine a delay based upon the location within the message distribution pattern; and provide, after the delay, a second acoustic signal corresponding to the first acoustic signal and comprising the data to be distributed throughout the plurality of transceivers.

11. The system of claim 10, wherein the plurality of transceivers comprise an undersea communication network.

12. The system of claim 10, wherein the installation pattern comprises a hexagonal grid.

13. The system of claim 12, wherein the plurality of transceivers are substantially equally spaced within the hexagonal grid.

14. The system of claim 12, wherein each transceiver of the plurality of transceivers is configured to determine the location of the transceiver within the message distribution pattern by determining a location in the hexagonal grid relative to an origin of the first acoustic signal.

15. The system of claim 10, wherein each transceiver of the plurality of transceivers is configured to determine the delay by selecting among a long delay and a short delay based upon the location of the transceiver within the message distribution pattern.

16. The system of claim 15, wherein the short delay comprises at least one of a delay until a next transmission epoch after the first acoustic signal was obtained or a delay until a second transmission epoch after the first acoustic signal was obtained.

17. The system of claim 10, wherein each transceiver of the plurality of transceivers is configured to cryptographically verify the first acoustic signal prior providing the second acoustic signal.

18. An apparatus comprising:
one or more speakers;
one or more microphones; and
one or more processors configured to:
obtain, via the one or more microphones, a first acoustic signal from a transceiver of a plurality of transceivers arranged in an installation pattern, wherein the first acoustic signal is configured with data to be distributed throughout the plurality of transceivers;

determine, from the first acoustic signal configured with the data to be distributed throughout the plurality of transceivers, a location of the apparatus within a message distribution pattern;

determine a delay based upon the location of the apparatus within the message distribution pattern; and provide, via the one or more speakers after the delay, a second acoustic signal corresponding to the first acoustic signal and comprising the data to be distributed throughout the plurality of transceivers.

19. The apparatus of claim 18, wherein the plurality of transceivers comprise an undersea communication network.

20. The apparatus of claim 18, wherein the one or more processors are configured to determine the delay by selecting among a long delay and a short delay.

* * * * *